Oct. 27, 1936.    G. A. ELLESTAD    2,058,673
OPHTHALMIC MOUNTING
Filed July 21, 1934
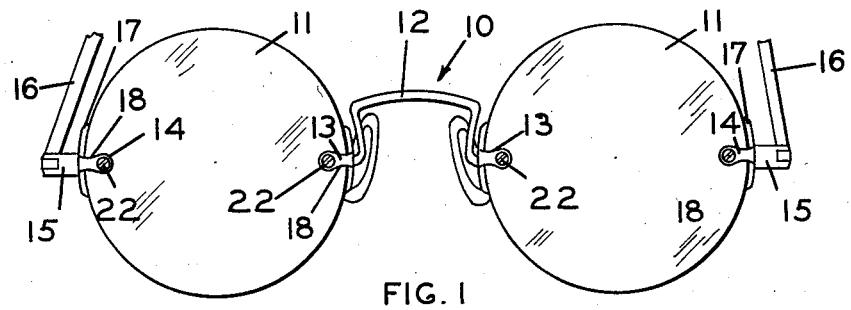
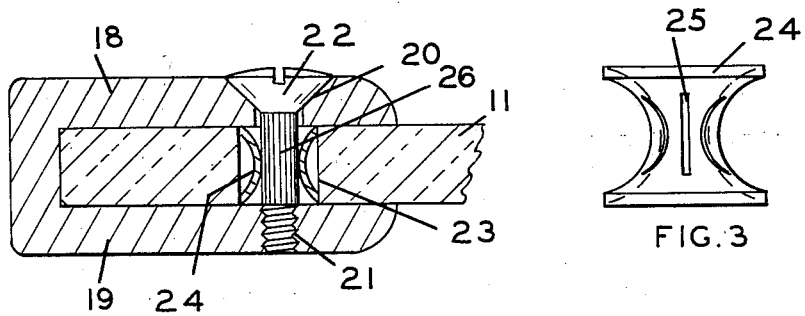
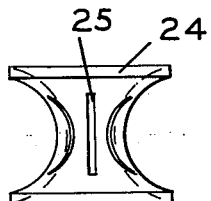
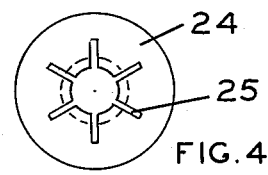
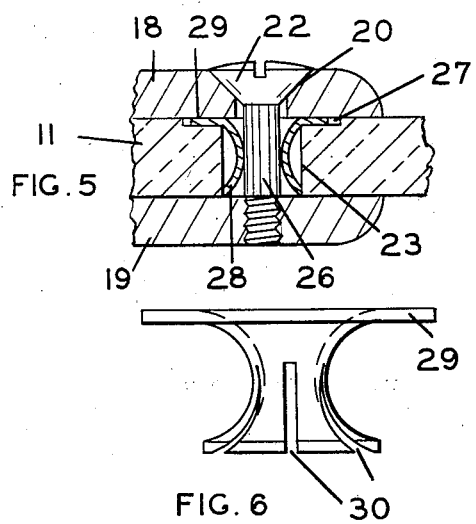
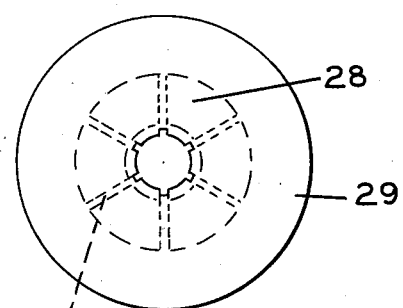
Bernard A. Ellestad
INVENTOR Patented Oct. 27, 1936

2,058,673

UNITED STATES PATENT OFFICE 2,058,673

OPHTHALMIC MOUNTING

Gerhard A. Ellestad, Rochester, N. Y., assignor to Bausch & Lomb Optical Company, Rochester, N. Y., a corporation of New York Application July 21, 1934, Serial No. 736,387

4 Claims. (Cl. 88—47)

This invention relates to ophthalmic mountings and more particularly it has reference to lens holding devices or mountings which are used for rimless spectacles and eyeglasses.

One of the objects of my invention is to provide an improved mounting for rimless spectacles. Another object is to provide means whereby a lens may be yieldably held in a rimless mounting. A further object is to provide means whereby an ordinary standard rimless mounting may be yieldably attached to a lens. A still further object is to provide means for holding the screw of an ophthalmic mounting against turning. These and other objects and advantages reside in certain novel features of construction, arrangement and combination of parts as will hereinafter be more fully described and pointed out in the appended claims.

Referring to the drawing:

Fig. 1 is a view of a pair of spectacles embodying my invention.

Fig. 2 is a horizontal sectional view, on an enlarged scale, of the lens strap.

Fig. 3 is a side view of the resilient thimble which is positioned within the lens opening.

Fig. 4 is a top plan view of same.

Fig. 5 is a sectional view of a modification of my invention.

Fig. 6 is a side view of the modified resilient thimble.

Fig. 7 is a top plan view of same.

A preferred embodiment of my invention is illustrated in the drawing wherein 10 indicates a pair of rimless spectacles embodying the lenses 11 connected by the bridge 12 provided with lens clamps 13. The lens clamps 14 carry endpieces 15 on which are pivotally mounted the temples 16. The lens clamps 13 and 14 comprise a shoe portion 17 adapted to engage the edge of the lens 11 and two straps 18 and 19 which are positioned, respectively, on the front and rear faces of lens 11. The strap 18 is provided with the countersunk aperture 20 while the rear strap 19 has the threaded aperture 21. A retaining element such as screw 22 is positioned in the apertures and passes through the opening 23 in the lens 11. This structure is embodied in the ordinary standard type of rimless mounting which is well known in the art and has gone into a wide and extensive use. With such a type of mounting, however, the screw will soon become loose in actual use so that the connection between the lens and mounting is loose and wobbly. Great care is also required in properly fitting such a type of mounting to the lens so that the lens opening will be properly positioned and the shoe properly located along the edge of the lens in order to provide a secure mounting.

I am able to overcome these objections by employing a resilient thimble 24 of such shape as shown in Fig. 3, for example. The thimble 24 may have slits 25 in its wall or be otherwise constructed so as to afford resiliency. The thimble 24 is positioned within the lens opening 23, the mounting is placed on the lens and the screw 22 is then forced down through the center of the thimble and into the threaded aperture 21. The thimble thus has portions engaging the wall of the opening 23 and portions engaging the body of the screw 22. If desired, the screw 22 may be provided with a knurled portion 26 so as to increase the frictional engagement between the thimble and the screw. It will be apparent that the screw 23 will be held against turning due to its engagement with the thimble and the lens 11 will be yieldably mounted relative to the mounting so that loose play between lens and mounting will be taken up by the spring thimble. The frictional engagement between thimble and screw is such that the screw can be turned with a screw driver but the resistance prevents the screw from turning during use of the mounting.

In the modification shown in Figs. 5-7, the lens 11 is provided, on one of its faces, with a counterbored portion or recess 27 adjacent the opening 23. The thimble 28 is provided with a relatively large top flange portion 29 which is seated in the recess 27 as shown in Fig. 5. The lower portion of the thimble may be cut as at 30 or otherwise constructed so as to afford resiliency. In this modified form the resilient thimble also affords a yieldable connection between the mounting and the lens. The middle portion of the thimble extends inwardly into contact with the screw and so serves to hold the screw from turning. The frictional engagement between the screw and thimble can, of course, be overcome by using a screw driver in the usual manner.

From the foregoing it will be apparent that I am able to attain the objects of my invention and provide an improved rimless mounting which affords a yieldable connection between it and the lens and also embodies means tending to prevent accidental loosening of the screw. The invention can be applied and used in connection with the ordinary, standard type of rimless mounting now in wide use so that a special type of mounting is not necessarily required. My invention may, of course, be modified and altered to afford different modifications without departing from the spirit of my invention.

I claim:

1. An ophthalmic mounting comprising a pair of spaced straps positioned on opposite sides of an ophthalmic lens having an opening, each of said straps having an aperture in alignment with said opening, a retaining element positioned in said apertures and opening and secured to one of said straps, and resilient means forming a yieldable connection between said lens and said mounting positioned in said opening, the vertical dimension of said means being no greater than the thickness of the lens, said means comprising a slotted tubular member whose ends extend outwardly to engage the wall of said opening and whose middle portion extends inwardly to engage said element.

2. In an ophthalmic mounting, the combination of a lens having an opening, a strap positioned on a face of the lens, a screw secured to said strap and extending into the opening, resilient means positioned in said opening, said means comprising a tubular member having a reduced central diameter, the central part of said means being in contact with the screw and the end parts of said means being in contact with the wall of the opening, said means extending around the screw whereby the lens and strap are yieldably held relative to each other and the screw is held against turning.

3. In an ophthalmic mounting, the combination of two spaced straps, a lens having an opening positioned between said straps, a screw positioned in the opening and threaded into one of said straps, a concavo-convex resilient member positioned in said opening between the screw and the wall of the opening, the convex middle portion of said member projecting inwardly into contact with the screw, the end portions of said member projecting outwardly and being in contact with said lens.

4. An ophthalmic mounting comprising a pair of straps positioned on opposite sides of a lens having an opening, said lens having a recess adjacent the opening, a retaining element positioned in said opening and structurally connecting said straps, and resilient means having a portion seated in said recess and another portion extending into the opening whereby the lens and mounting are yieldably held relative to each other.

GERHARD A. ELLESTAD.